United States Patent
Chen

(10) Patent No.: US 6,283,591 B1
(45) Date of Patent: Sep. 4, 2001

(54) ATTACHMENT GLASSES TO THE SPECTACLES

(76) Inventor: Lee-Tsung Chen, P.O. Box 697, Feng-Yuan City 420 (TW)

( * ) Notice: Subject to any disclaimer, the term of this patent is extended or adjusted under 35 U.S.C. 154(b) by 0 days.

(21) Appl. No.: 09/713,817

(22) Filed: Nov. 13, 2000

(51) Int. Cl.[7] ........................................... G02B 9/00
(52) U.S. Cl. .................................. 351/47; 351/57
(58) Field of Search ........................ 351/47, 57, 44, 351/48, 58, 41, 158

(56) References Cited

U.S. PATENT DOCUMENTS 6,089,708 * 7/2000 Ku ........................................... 351/47

* cited by examiner

Primary Examiner—Hung Xuan Dang

(57) ABSTRACT

An attachment glasses to the spectacles includes a pair of rims with gasses connected by a T-shaped bar which has an extension centrally projected inward having a transverse axial hole in the proximity of free end, a pair of first and second clipping plates in symmetrical arrangement each has a pair of axial holes rotatably secured to the transverse axial hole of the T-shaped bar by an axial pin, a padded transverse groove engageable with the bridge of the spectacles, a pair of magents beneath the groove. When the grooves engage with the bridge, the magnets of the first and second clipping plates will attract each other in order to firmly clip the attachment glasses to the spectacles.

6 Claims, 5 Drawing Sheets

(4—4)

ATTACHMENT GLASSES TO THE SPECTACLES

BACKGROUND OF THE INVENTION

The present invention relates to spectacles and more particularly to an attachment glasses to the spectacles which can be readily attached to the bridge of a pair of spectacles.

A pair of spectacles not only improve user's eyesight, protect the eye from under strong light and ultraviolet rays but also beautify the face of the user. A nearsightedness could not leave the spectacles and felt difficult to walk under the sunshine. If he wears a pair of plane dark colored spectacles, he can not see anything in front of him except that the lens of the dark colored spectacle has the same degrees suitable to him, this may cost too much for him. So that an attachable sun glasses is therefore produced to directly attach to the lens of the spectacles to solve this problem. However, the attachment of this attachable sun glasses has many disadvantages on design. It always break off under any vibration when the user jumps or runs.

SUMMARY OF THE PRESENT INVENTION

The present invention has a main object to provide a attachment glasses to the spectacles which can firmly attach to the spectacles without breaking off.

Another object of the present invention is to provide the attachment glasses to the spectacle which is easy to manufacture and needs not to modify the spectacles.

Accordingly, the attachment glasses of the present invention comprises generally a pair of glasses connected by a roughly T-shaped bar, a clip hinged to the T-shaped bar for clipping the attachment glasses to the bridge of the spectacles. Because of that each of the clipping pieces of the clip has magnets on inner side. So that the attachment of the glasses to the spectacles is very reliable and secure.

The present invention will become more fully understood by reference to the following detailed description thereof when read in conjunction with the attached drawings.

DETAILED DESCRIPTION OF THE PREFERRED EMBODIMENT

Figure 1:
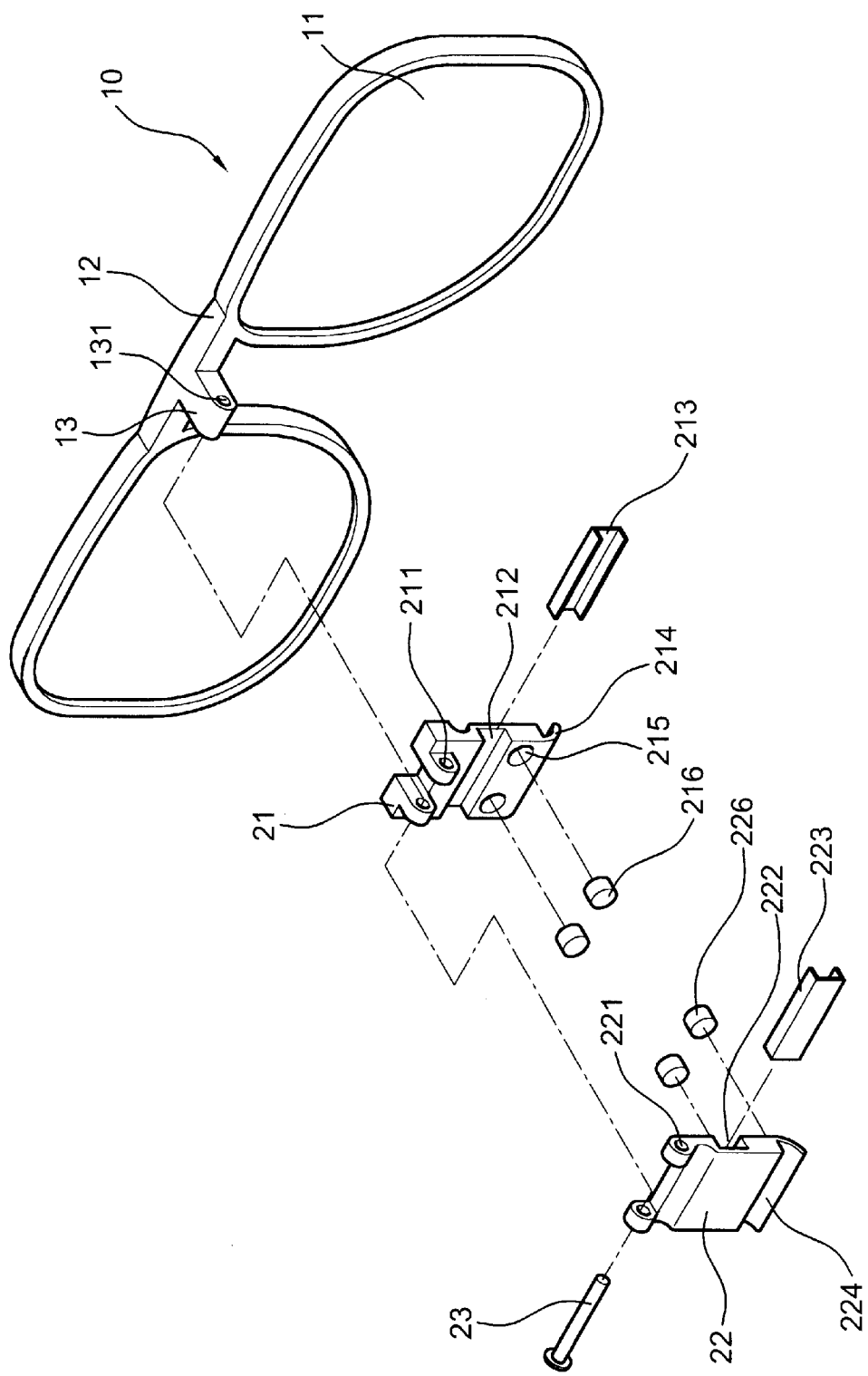
FIG. 1 is an exploded perspective view to show the attachment glasses according to a preferred embodiment of the present invention.

With reference to FIGS. 1 to 5 of the drawings, the attachment glasses to the spectacles of the present invention comprises generally a frame 10 which is composed of a pair of rims with glasses 11 therein and a roughly T-shaped bar 12 connected the rims therebetween. The T-shaped bar 12 has a transverse extension 13 perpendicularly projected outward including an axial hole 131 transversely formed in proximity of the free end.

A pair of first and second clipping plates 21 and 22 are symmetrically formed each has a transverse groove 212 and 222, in inner surface facing each other, a pair of retaining recesses 215 and 216 formed spaced apart in a lower portion beneath the groove 212 and 222 for retaining a pair of magnets 216 and 226, a flexible cushion 213 and 223 fixedly disposed into the groove 212 and 222 and a bent outward piece 214 and 224 at lower end. The first clipping plate 21 further has a pair of inwardly protrudent axial holes 211 on upper portion made engageable with the axial hole 131 of the T-shaped bar 12 and the second clipping plate 22 further has a pair of upwardly protrudent axial holes 221 on the top made engageable with the outside of the axial holes 211 of the first clipping plate 21.

Figure 2:
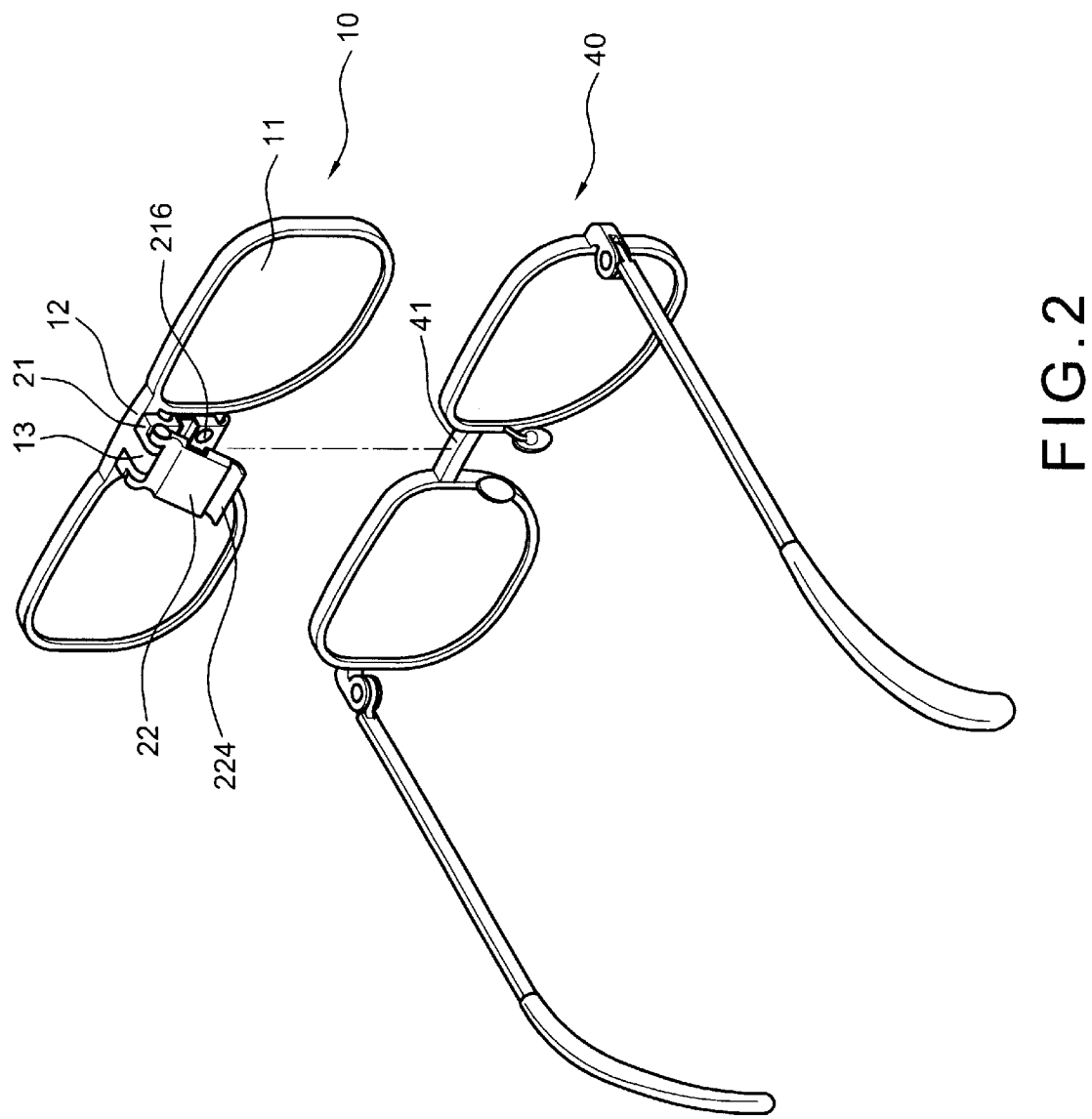
FIG. 2 is a perspective view to show an assembly of FIG. 1 where the attachment glasses is about to attach to the spectacles.
Figure 3:
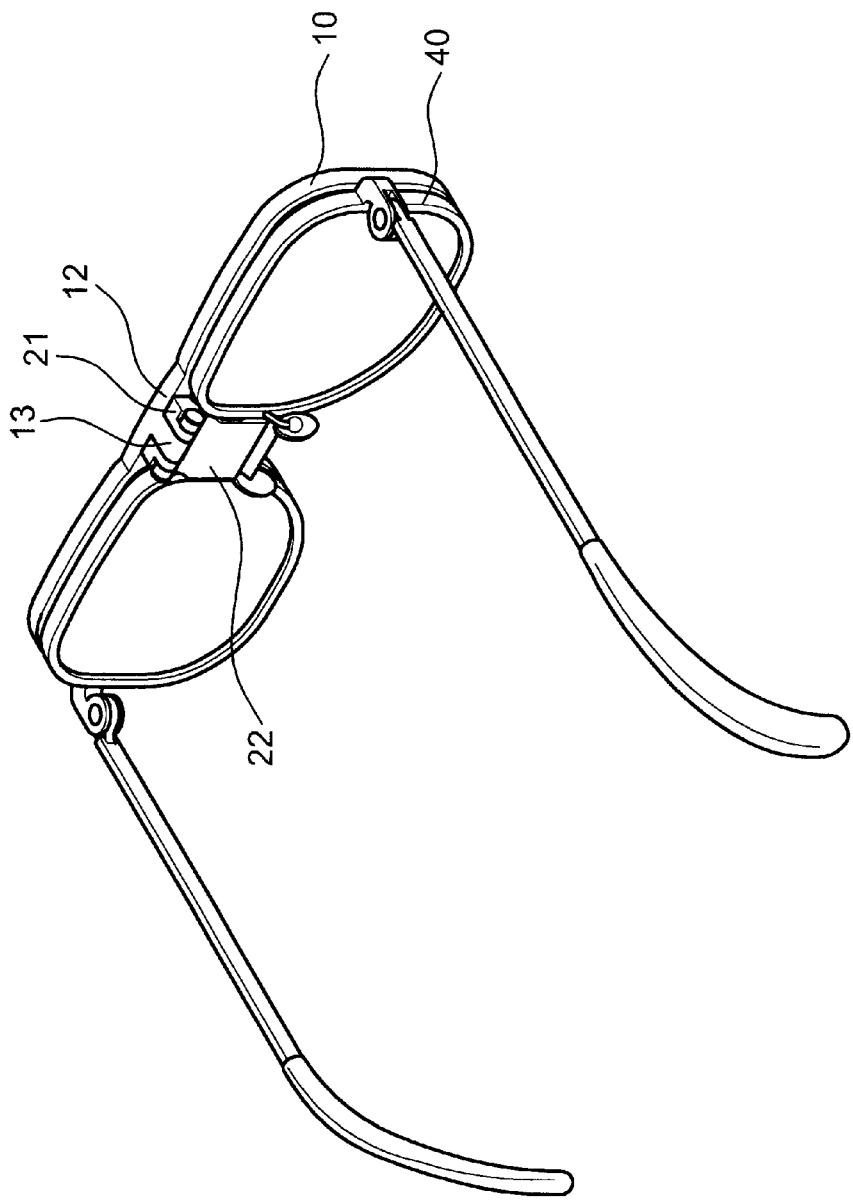
FIG. 3 is a perspective view to show that the attachment glasses is attached to the spectacles.
Figure 4:
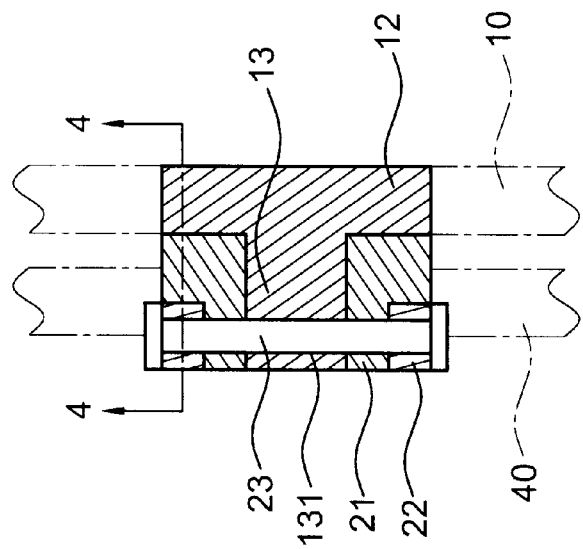
FIG. 4 is a sectional view to the first and second clipping pieces hinged to the T-shaped bar.
Figure 5:
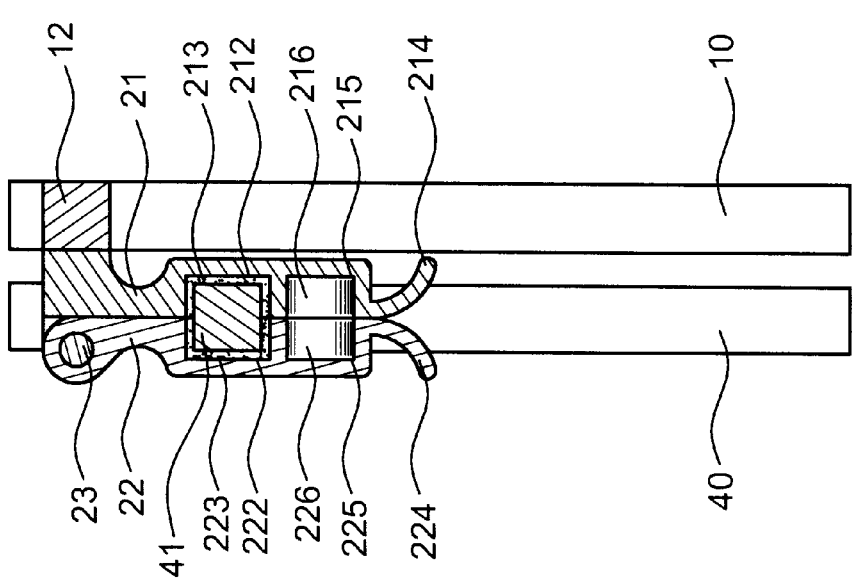
FIG. 5 is a sectional view taken along line 4—4 of FIG. 3.

When assembly, engage the axial holes 131, 211 and 221 together, then rotatably secured by an axial pin 23 (as shown in FIGS. 2 and 4). Because of that the magnets 216 and 226 have their opposing poles facing each other, when the first and the second clipping plates 21 and 22 mount to a bridge 41 of the spectacles 40, they will attract to each other and therefore firmly clipping the attachment glasses 10 onto the bridge 41 of the spectacles 40 wherein the grooves 212 and 222 engage with the bridge 41 (as shown FIGS. 3 and 5). This attachment of the attachment glasses 10 to the spectacles 40 should be very stable and without breaching off on any vibration. Besides the clipping plates 21 and 22 are positioned above the nose pads of the spectacles 40, it would not touch the nose of the user.

Figure 6:
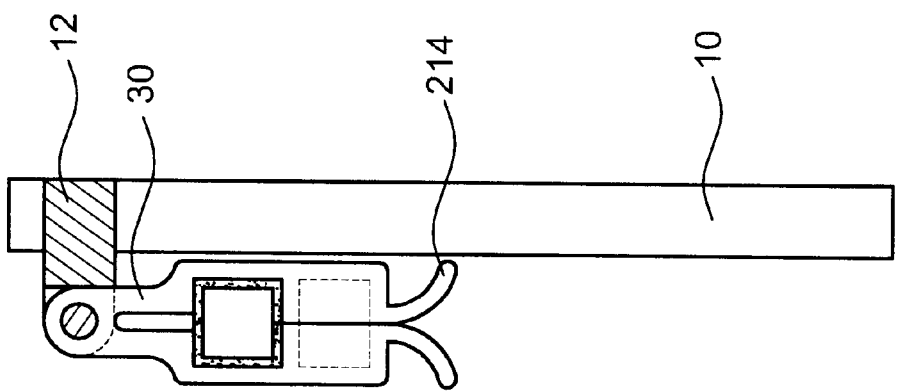
FIG. 6 is a side view to show an elastic inverse U-shaped clip disposed between the clipping plates.

Referring to FIG. 6, if dispose an elastic inverse U-shaped clip 30 between the upper portion of the clipping plates 21 and 22, the attachment would be more stable.

The specification relating to the above embodiment should be construed as exemplary rather than as limitative of the present invention, with many variations and modifications being readily attainable by a person of average skill in the art without departing from the sprit or scope thereof as defined by the appended claims and their legal equivalents.

I claim:

1. An attachment glasses to the spectacles comprising:

a pair of rims having glasses therein connected with each other by a T-shaped bar therebetween, side T-shaped bar having an extension centrally projected inward including a fist axial hole transversely formed in proximity of free end thereof;

a pair of first and second clipping plates rotatably hinged to the first axial hole of the T-shaped bar by means of an axial pin, said first and second clipping plates being in symmetrical arrangement each having a transverse groove in a middle inner surface padded by a flexible cushion, a pair of retaining recesses formed spaced apart in a lower inner portion beneath the groove, a pair of magnets engaged into the recesses respectively and a bent outward lower end.

2. The attachment glasses as recited in claim 1 wherein said first clipping further has a pair of inwardly protrudent second axial holes formed spaced apart on top engageable with the first axial hole of the T-shaped bar.

3. The attachment glasses as recited in claim 1 wherein said second clipping plate further has a pair of upward protrudent third axial holes formed spaced apart on top engageable with outside of the second axial holes of the first clipping plate.

4. The attachment glasses as recited in claim 1 wherein said magnets in the first clipping plate has the pole opposite to the pole of the magnets in the second clipping plate.

5. The attachment glasses as recited in claim 1 wherein said grooves engage with the bridge of the spectacles.

6. The attachment glasses as recited in claim 1 wherein an inverse U-shaped elastic clip may be disposed between the first and second clipping plates above the grooves.

* * * * *